(12) United States Patent
Mulrooney et al.

(10) Patent No.: US 6,588,272 B2
(45) Date of Patent: Jul. 8, 2003

(54) REDUNDANT LEVEL MEASURING SYSTEM (75) Inventors: Michael J. Mulrooney, Downers Grove, IL (US); Boyce M. Carsella, Jr., Ingleside, IL (US); Paul D. Myatt, Naperville, IL (US); Don P. Sanders, Baton Rouge, LA (US)

(73) Assignee: Magnetrol International, Inc., Downers Grove, IL (US)

( * ) Notice: Subject to any disclaimer, the term of this patent is extended or adjusted under 35 U.S.C. 154(b) by 0 days.

(21) Appl. No.: 09/934,194

(22) Filed: Aug. 21, 2001

(65) Prior Publication Data

US 2003/0037613 A1 Feb. 27, 2003

(51) Int. Cl.$^7$ .............................................. G01F 23/02
(52) U.S. Cl. .............................. 73/324; 73/306; 73/309; 73/328; 73/329; 73/325; 73/326; 73/319; 73/322.5; 73/313; 73/323; 73/305; 73/324; 116/227; 116/204; 116/276
(58) Field of Search ......................... 73/324, 306, 309, 73/328, 329, 325, 326, 319, 322.5, 313, 323, 305; 116/227, 204, 276

(56) References Cited

U.S. PATENT DOCUMENTS

| | | | | |
|---|---|---|---|---|
| 2,720,785 A | * | 10/1955 | Sedgwick | 73/314 |
| 3,964,312 A | * | 6/1976 | Sebek | 73/319 |
| 4,457,171 A | * | 7/1984 | Gebauer | 73/305 |
| 4,483,193 A | * | 11/1984 | Bonetti | 73/313 |
| 4,695,796 A | * | 9/1987 | Omet et al. | 324/226 |
| 4,870,862 A | * | 10/1989 | Bonetti | 73/322.5 |
| 5,097,703 A | * | 3/1992 | Peter | 73/304 C |
| 5,103,674 A | * | 4/1992 | Outwater et al. | 73/319 |
| 5,136,884 A | * | 8/1992 | Lovett | 73/313 |
| 5,299,456 A | * | 4/1994 | Steiner | 73/308 |
| 5,743,137 A | * | 4/1998 | Brown et al. | 73/322.5 |
| 6,062,095 A | * | 5/2000 | Mulrooney et al. | 73/322.5 |
| 6,067,854 A | * | 5/2000 | Yang | 73/305 |
| 6,253,611 B1 | * | 7/2001 | Varga et al. | 73/319 |

FOREIGN PATENT DOCUMENTS

| | | | | |
|---|---|---|---|---|
| SU | 767532 | * | 7/1978 | 73/319 |

* cited by examiner

Primary Examiner—Daniel S. Larkin
Assistant Examiner—André K. Jackson
(74) Attorney, Agent, or Firm—Wood, Phillips, Katz, Clark & Mortimer (57) ABSTRACT

A redundant level measuring system comprises a chamber for fluidic coupling to a process vessel whereby material level in the vessel equalizes with material level in the chamber. A float including a magnet in the chamber rises and falls with material level in the chamber. A magnet actuated visual indicator is mounted to the chamber for indicating level of the magnet in the chamber. A measurement instrument includes a probe and a measurement circuit. The instrument is mounted atop the chamber with the probe extending downwardly into the chamber. The measurement circuit measures a characteristic of the probe representing level of the material in the chamber. A shield in the chamber isolate the float from the probe.

22 Claims, 7 Drawing Sheets

FIG. 12

REDUNDANT LEVEL MEASURING SYSTEM

BACKGROUND OF THE INVENTION

Numerous technologies exist for measuring level of liquids or solids in an industrial process environment. Among these are transmitters which measure the level and transmit a signal representing actual level. The techniques for measuring level include guided wave radar, magnetostrictive, capacitance and the like.

A magnetic level indicator is another type of commonly used level sensing device. A magnetic level indicator, also known as a flipper gauge, is constructed of a chamber, a float and a visual indicator. The chamber, also known as a cage, is essentially a pipe or similar device external to a process tank or vessel which is usually mounted horizontally and which is usually connected to the tank through two or more horizontal pipes. One of the horizontal pipes is near the bottom of the chamber and the other is near the top of the cage. This arrangement allows the material level in the chamber to equalize with the material level in the tank, largely isolating the cage from agitation, mixing or other activities in the tank. The chamber, which is usually a pressure vessel, can be isolated from the tank using valves. The float is sized and weighted for the specific gravity and pressure of the application and contain magnets which actuate a visual indicator on the outside of the chamber to indicate level.

In certain applications it is desirable to transmit a level signal to a remote device in addition to the local visual indication of a magnetic level indicator. Currently, magnetic level indicators are used with magnetostrictive transmitters or with a series of reed switches, either of which provides an indication of continuous level which is redundant to the primary visual indication provided by the magnetic level indicator. Both the magnetostrictive and reed switch sensors are located on and external to the chamber and are actuated by the magnet placed inside the float in the chamber. A significant drawback to these redundant systems is that the float may fail, in which case both the primary visual and secondary transmitter signals are lost.

The present invention is directed to overcoming one or more of the problems discussed above in a novel and simple manner.

SUMMARY OF THE INVENTION

In accordance with the invention, a redundant level measuring system includes a probe-type measurement instrument with the probe mounted in the chamber.

Broadly, there is disclosed herein a redundant level measuring system comprising a chamber for fluidic coupling to a process vessel whereby material level in the vessel equalizes with material level in the chamber. A float including a magnet in the chamber rises and falls with material level in the chamber. A magnet actuated visual indicator is mounted to the chamber for indicating level of the magnet in the chamber. A measurement instrument includes a probe and a measurement circuit. The instrument is mounted atop the chamber with the probe extending downwardly into the chamber. The measurement circuit measures a characteristic of the probe representing level of the material in the chamber. Shield means in the chamber isolate the float from the probe.

It is a feature of the invention that the probe comprises a coaxial probe having a signal rod contained in an outer tube and wherein the outer tube defines the shield means.

It is another feature of the invention that the shield means physically isolates the probe from the float.

Still another feature of the invention is that the shield means comprises an elongate screen extending longitudinally in the chamber providing an electromagnetic shield and the screen is disposed between the probe and the float. The screen comprises a ferrous metal screen. In one aspect of the invention the probe comprises a twin rod probe. In accordance with another aspect of the invention the probe comprises a single rod transmission line. In accordance with still a further aspect of the invention the probe comprises a transmission line and the screen comprises a return for the transmission line.

It is a further feature of the invention that the shield means comprises an electromagnetic shield cage housing the float in the chamber.

It is still a further feature of the invention wherein the probe comprises a capacitance probe.

There is disclosed in accordance with another aspect of the invention a redundant level measuring system comprising a chamber for fluidic coupling to a process vessel whereby material level in the vessel equalizes with material level in the chamber. A float including a magnet in the chamber rises and falls with material level in the chamber. A magnet-actuated visual indicator is mounted to the chamber for indicating level of the magnet in the chamber. A guided wave radar measurement instrument includes a probe defining a transmission line. The instrument is mounted atop the chamber with the probe extending downwardly into the chamber. A measurement circuit is connected to the probe for generating pulses on the transmission line and receiving reflected pulses returned on the transmission line, the reflective pulses representing the level of the material in the chamber. Shield means in the chamber electromagnetically isolate the float from the transmission line.

Further features and advantages of the invention will be readily apparent from the specification and from the drawings.

DETAILED DESCRIPTION OF THE INVENTION

Figure 1:
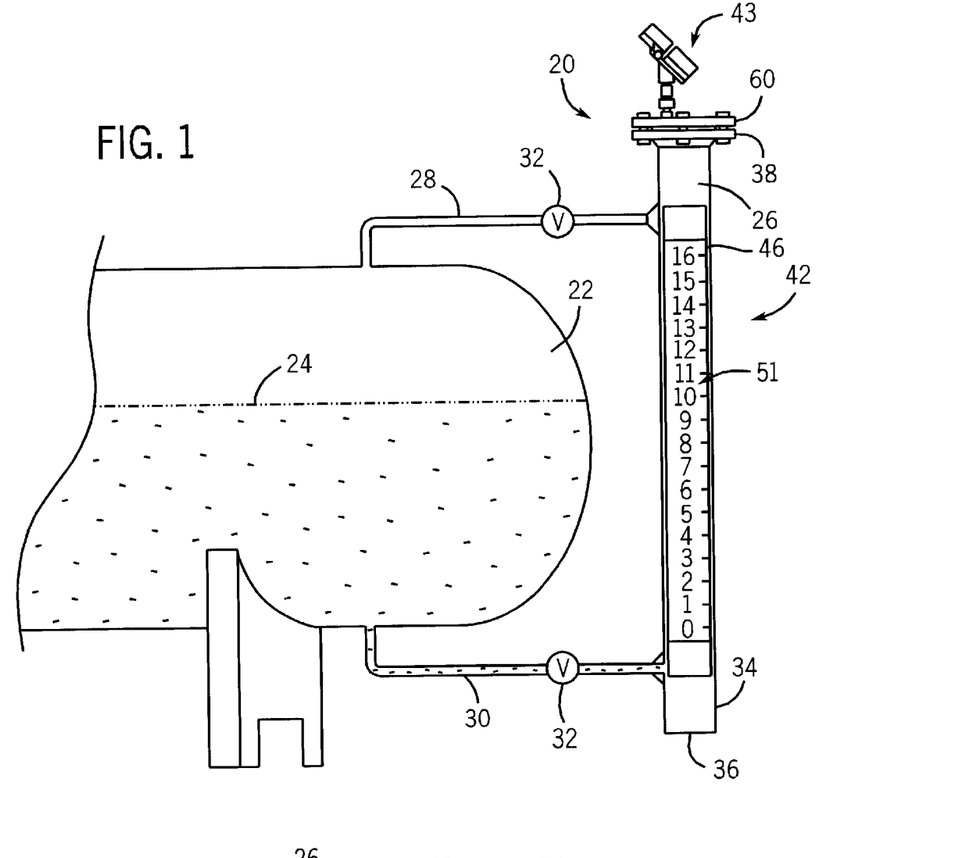
FIG. 1 is an elevation view of a redundant level measuring system in accordance with the invention mounted to a process vessel.

In accordance with the invention, a redundant level measuring system 20, see FIG. 1, is provided. The redundant level measuring system 20 is used for providing redundant level measurement of a tank or vessel 22 having a material 24, the level of which is to be sensed. The level measuring system includes a chamber 26 for fluidic coupling to the vessel 22 via a first horizontal pipe 28 near the top of the vessel 22 and a second horizontal pipe 30 near the bottom of the vessel 22. The vessel 22 can be isolated from the chamber 26 using valves 32 in each of the top pipe 28 and the bottom pipe 30.

Figure 3:
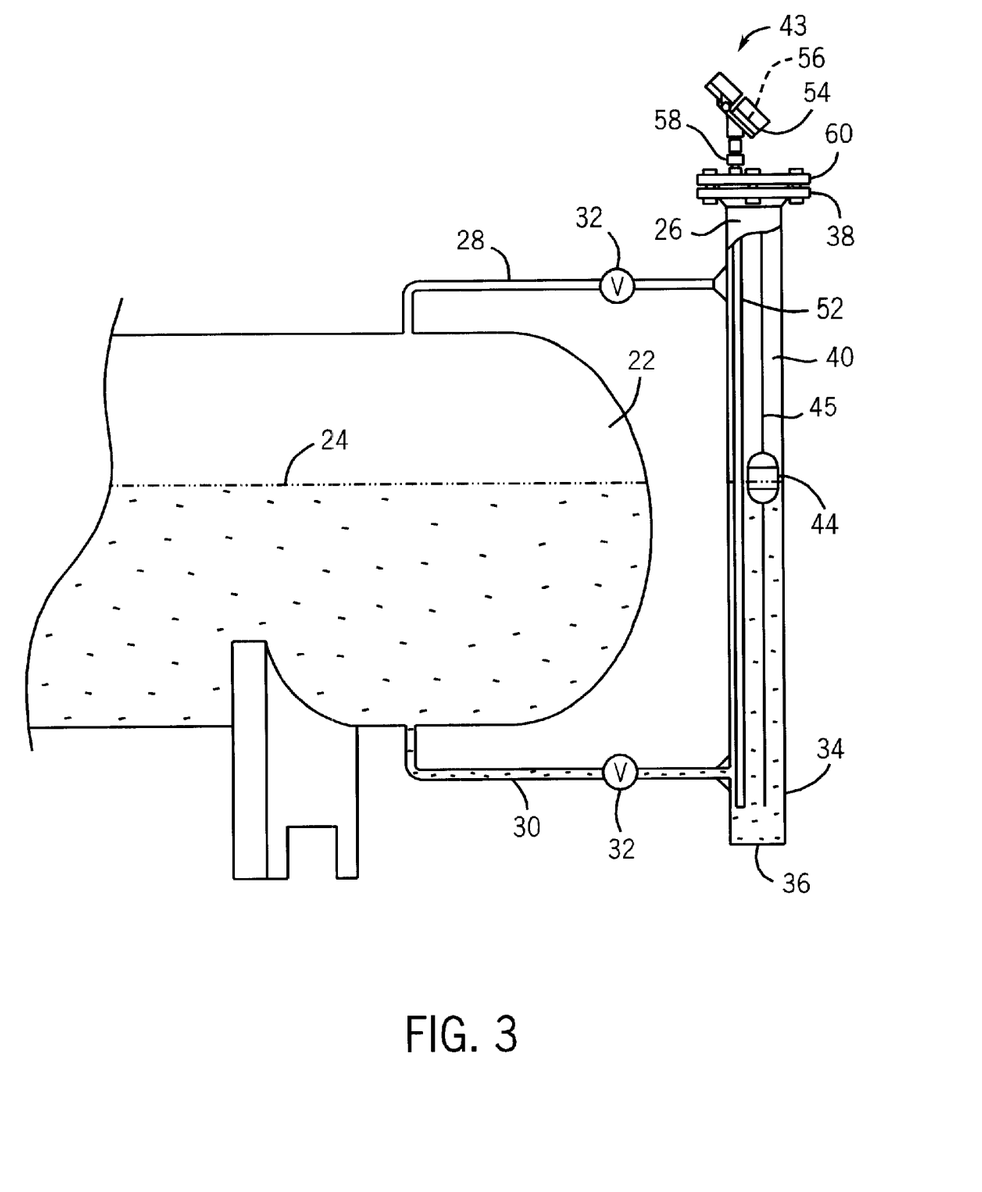
FIG. 3 is an elevation view similar to FIG. 1, with a portion of a chamber cut away to more particularly illustrate the redundant level measuring system according to the invention.

Referring also to FIG. 3, the chamber 26 comprises an elongate pipe 34 closed at a bottom 36 and having a top flange 38 to define an interior space 40. The described arrangement allows the material level in the vessel 22 to equalize with level in the chamber 26, as illustrated, while largely isolating the chamber 26 from agitation, mixing or other activities in the vessel 22.

In accordance with the invention, the redundant level measuring system 20 comprises a magnetic level indicator 42 and a level transmitter 43.

Figure 2:
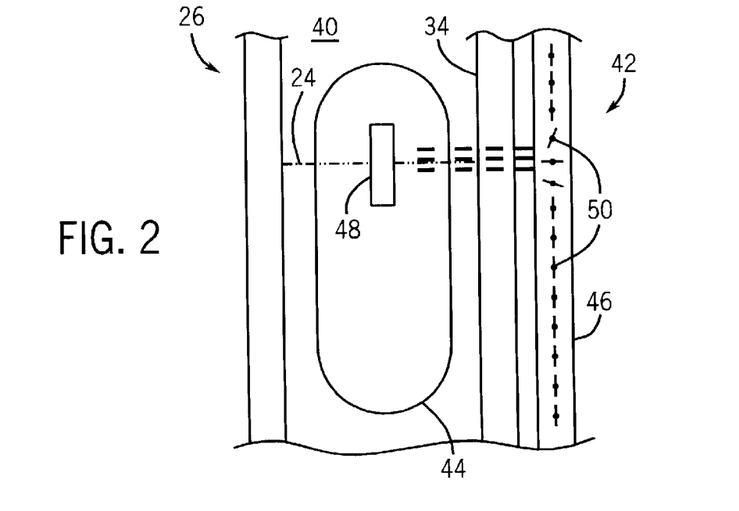
FIG. 2 is a cutaway view of a magnetic liquid level indicator of the redundant level measuring system of FIG. 1.

The magnetic level indicator 42, see FIGS. 1–3, includes a float 44 in the chamber interior space 40 and an external visual indicator 46. The float 44 rides up and down in the chamber 26 at the surface of the material 24. The float 44 is typically hollow so that it rides freely on the surface of the material 24. The float 44 may be made of stainless steel or the like and houses a magnet 48 adapted to be positioned at the surface of the material 24. As such, the float 44 is also referred to herein as a magnetic float. The float 44 is sized and weighted for the specific gravity and pressure of the application. The visual indicator 46 is strapped to the chamber 26 and is totally isolated from the process material 24. The visual indicator 46 includes rotating flags 50. Each flag 50 contains an alignment magnet which reacts to the float magnet 48 and protects against false actuation. With rising level, the flags 50 rotate, changing color. The floats are positioned alongside graduated markings 51 on the level indicator 46 to indicate level of the material 24.

The transmitter 43 comprises a measurement instrument including a probe 52 connected to a housing 54 containing a measurement circuit 56. A coupling 58 mounts the probe 52 to a flange 60 mounted atop the chamber flange 38. As such, the probe 52 extends downwardly into the interior space 40 of the chamber 26 to a level at or below level of the bottom pipe 30. In accordance with the invention, the transmitter 43 comprises a guided wave radar transmitter that uses time domain reflectometry. Such a transmitter may be as generally described in Carsella et al., Ser. No. 09/336,194 filed Jun. 18, 1999, owned by the assignee of the present application, the specification of which is hereby incorporated by reference herein. As described therein, the probe 52 defines a transmission line. The measurement circuit 56 is electrically connected to the probe 52 for generating pulses on the transmission line and receiving reflected pulses returned on the transmission line. The reflected pulses represent level of the material in the chamber 26. Particularly, assuming the chamber 26 is empty, then the geometry of the probe 52 and chamber 26 are selected to provide a select impedance which may be on the order of 50 ohms in air. With the material 24 located on the probe, the dielectric changes along the transmission line based on the dielectric constant of the material 24. This change of impedance causes the reflected pulses which are returned on the transmission line.

As described, the signal on the probe 52 is only dependent on the level of the material 24 being sensed. In a case of a failure of the float 44 and resulting loss of visual indication, the transmitter 43 continues to sense material level on the probe 52 and the level signal from the transmitter 43 continues to operate. A guided wave radar transmitter is not float-actuated and is therefore unaffected by changes in product density. Also, a guided wave radar transmitter does not have to be calibrated in each application by raising and lowering the product level.

The electromagnetic field produced by the guided wave radar probe 52 can interact with the magnetic float 44. In accordance with the invention, a shield is provided in the chamber 26 for isolating the magnetic float 44 from the probe 52.

Figure 4:
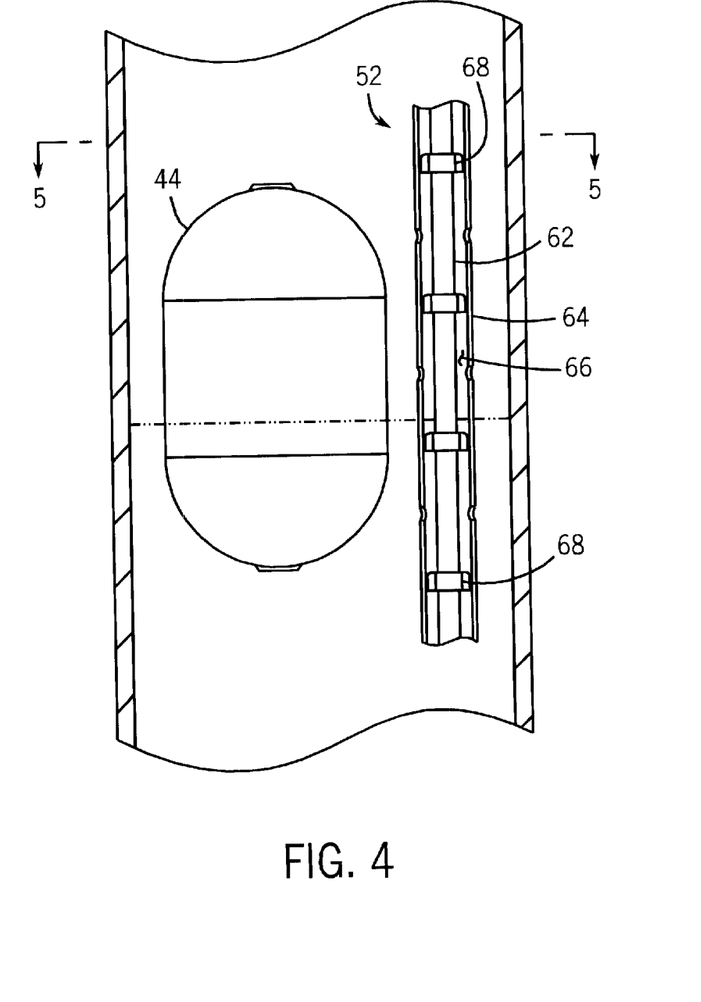
FIG. 4 is a detailed, cutaway partial sectional view illustrating the elements of the redundant level measuring system of claim 1 located within the chamber.
Figure 5:
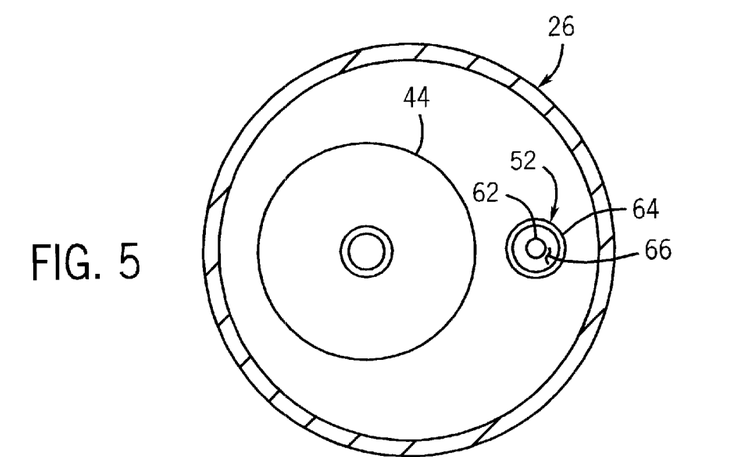
FIG. 5 is a sectional view taken along the line 5—5 of FIG. 4.

Referring to FIGS. 4 and 5, the probe 52 comprises a coaxial probe including a signal rod 62 completely contained in an outer tube 64. The outer tube 64, which is the signal return, is sometimes referred to as a stillwell. This is similar in construction to a common coaxial cable, except the dielectric in the case of a level measurement instrument is air in the space 66 between the rod 62 and outer tube 64. Spacing between the rod 62 and outer tube 64 is maintained by suitable spacers 68, as illustrated in FIG. 4. In this embodiment, the outer tube 64 provides an electromagnetic shield. The probe field is completely contained and the pulse traveling down the probe 52 is not reflected off of the float 44.

Figure 6:
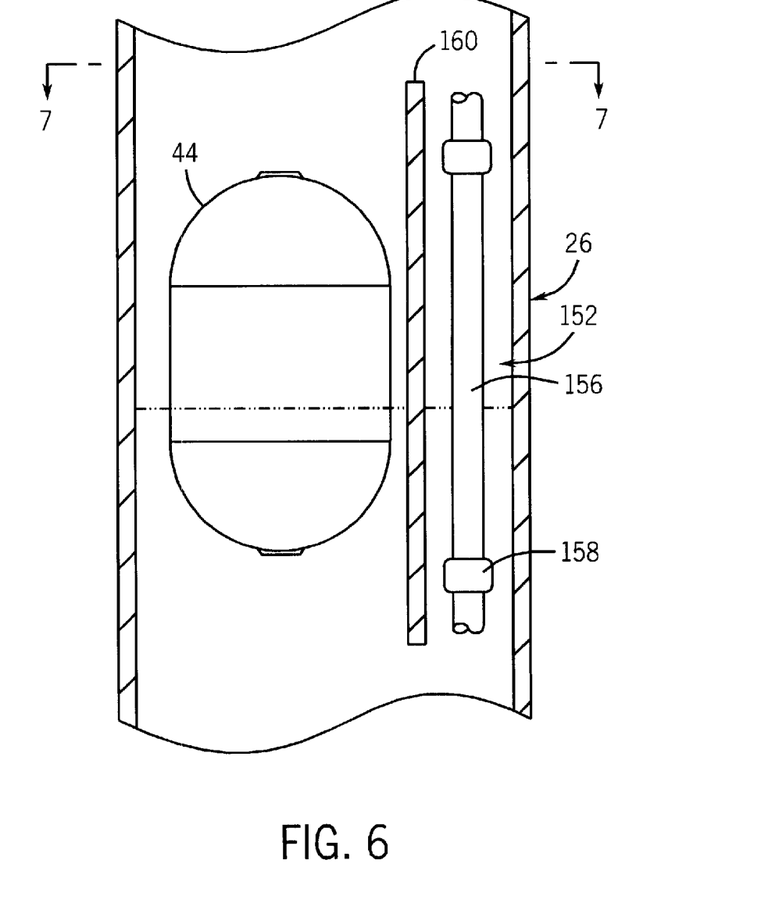
FIG. 6 is a view similar to that of FIG. 4 for a redundant level measuring system according to a second embodiment of the invention.
Figure 7:
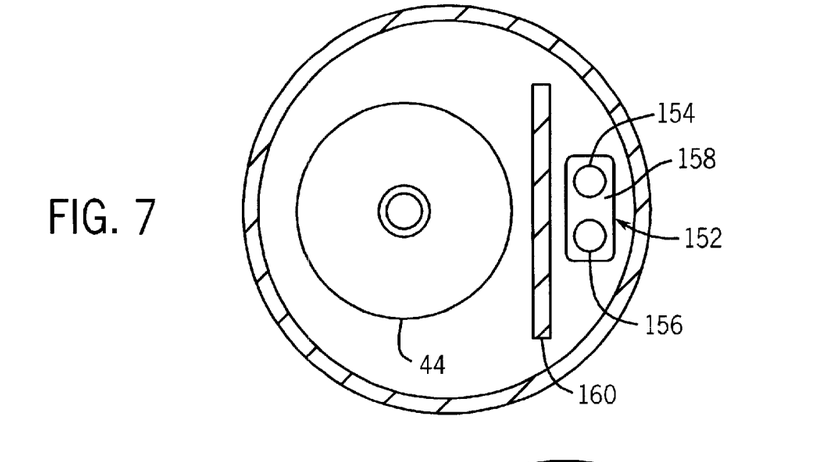
FIG. 7 is a sectional view taken along the line 7—7 of FIG. 6.

Referring to FIGS. 6 and 7, a probe 152 according to a second embodiment of the invention is illustrated. The probe 152 comprises a twin rod probe including a first rod 154 and a second rod 156 separated by spacers 158. The rod 154 acts as the signal rod while the rod 156 acts as the return. The twin rod probe 152 can be constructed from almost any geometry which provides signal and return rods side by side in space. In this embodiment, a shield in the form of an elongate screen 160 extends longitudinally in the chamber 26. The screen 160 is disposed between the probe 152 and the float 44. In this embodiment of the invention, the screen 160 comprises a ferrous metal screen.

Alternatively, the geometry of the system could be designed to obtain the desired impedance such that the shield 160 becomes the return.

Figure 8:
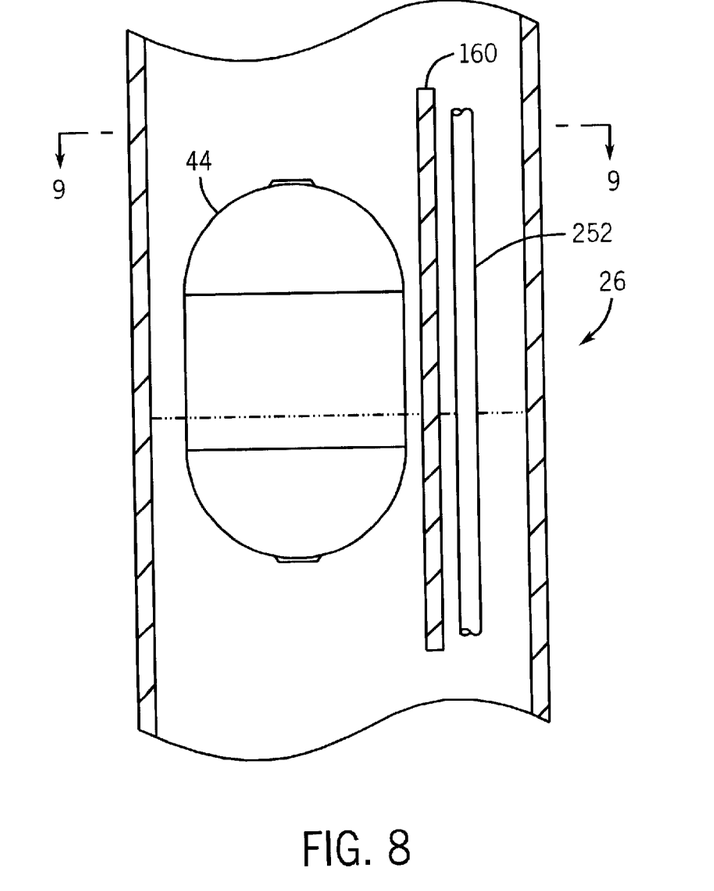
FIG. 8 is a view similar to that of FIG. 4 for a redundant level measuring system according to a third embodiment of the invention.
Figure 9:
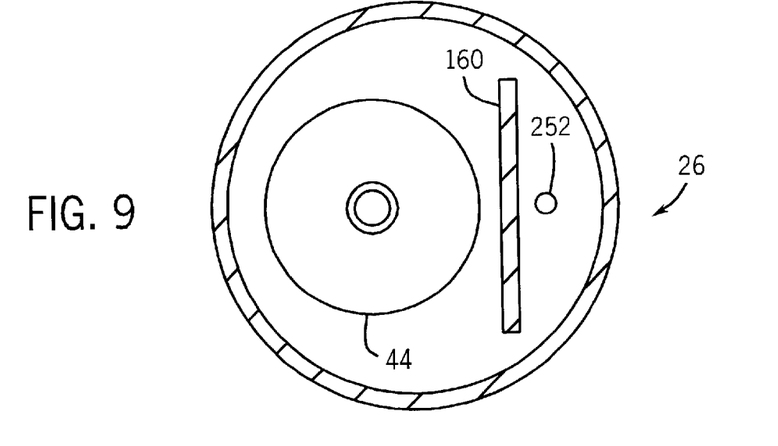
FIG. 9 is a sectional view taken along the line 9—9 of FIG. 8.

Referring to FIGS. 8 and 9, a probe 252 according to a third embodiment of the invention is illustrated. The probe 252 comprises a single rod probe. A single rod probe can be used when the geometry is such that proper impedance is obtained by using the chamber 26 as the return. A shield in the form of the screen 160 is provided between the float 44 and the probe 252.

Figure 10:
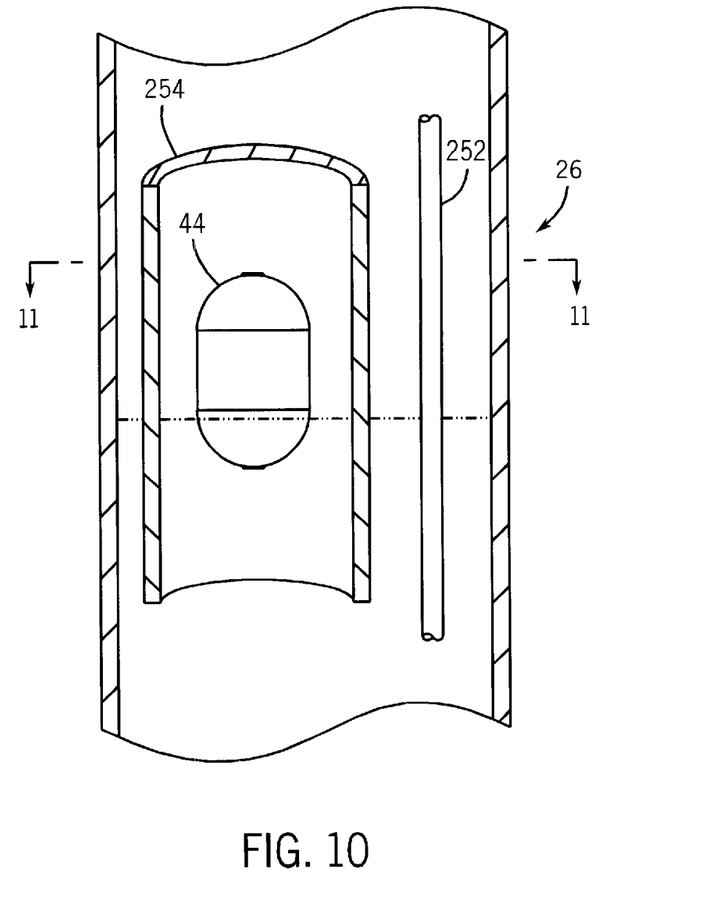
FIG. 10 is a view similar to that of FIG. 4 for a redundant level measuring system according to a fourth embodiment of the invention.
Figure 11:
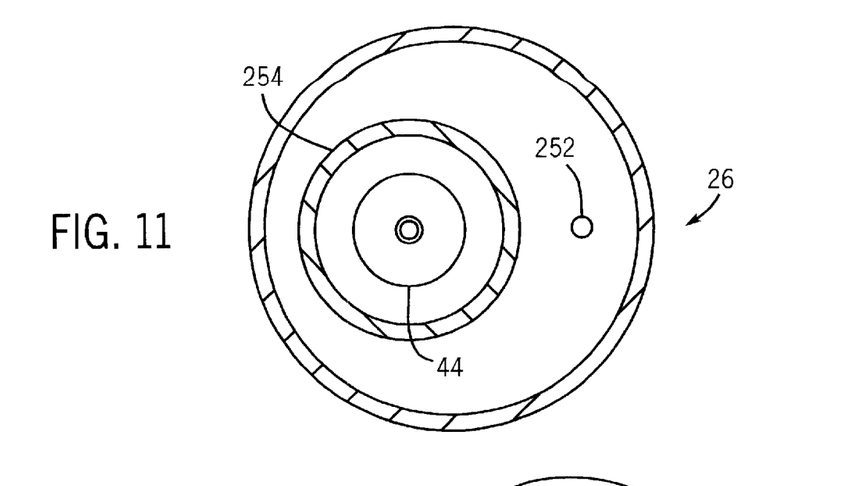
FIG. 11 is a sectional view taken along the line 11—11 of FIG. 10.

As is apparent, a variety of probe configurations could be used, with proper shielding, to protect the probe from the float. Still a further approach, illustrated in FIGS. 10 and 11, is to shield the float 44. In the illustrated embodiment of the invention, the float 44 is contained in a screen or cage 254 which provides electromagnetic shielding.

Figure 12:
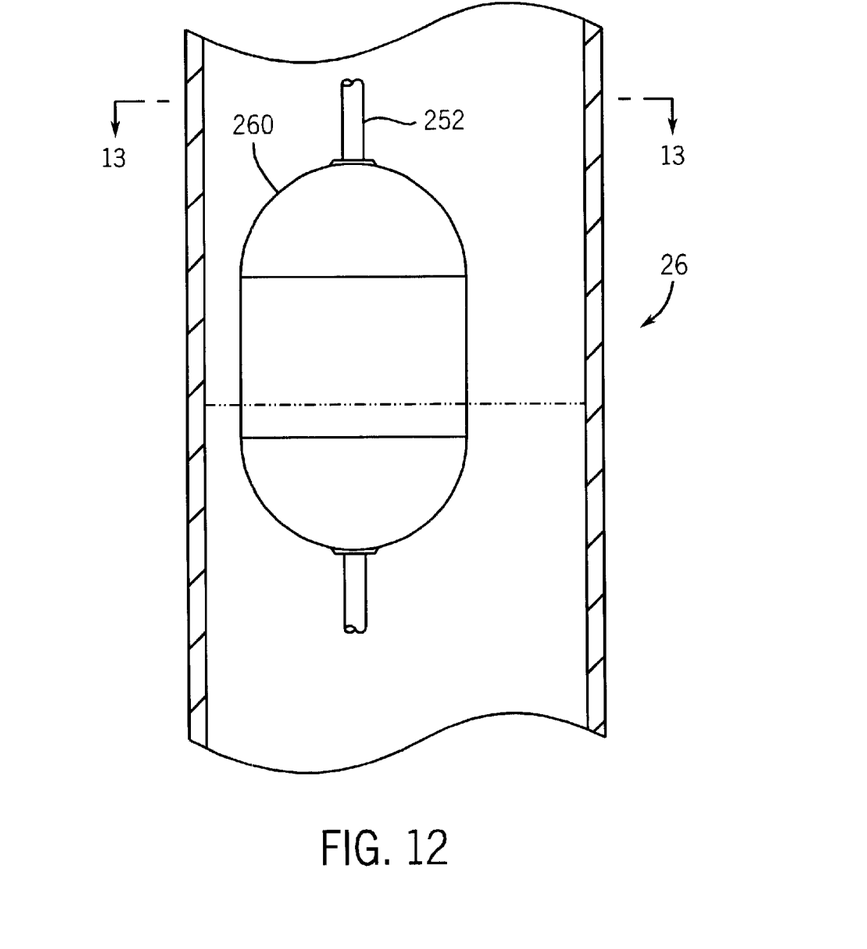
FIG. 12 is a view similar to that of FIG. 4 for a redundant level measuring system according to a fifth embodiment of the invention.
Figure 13:
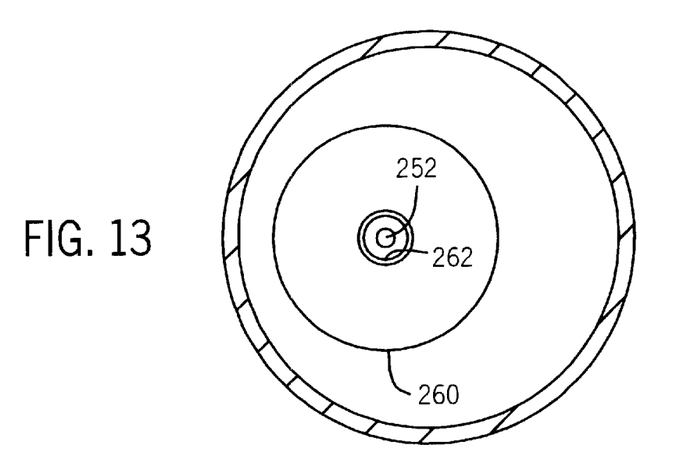
FIG. 13 is a sectional view taken along the line 13—13 of FIG. 10.

Referring to FIGS. 12 and 13, still another embodiment of the invention is illustrated. In this embodiment, the single rod probe 252 extends downwardly near the center of the chamber 26. A float 260 has a through opening 262 for receiving the rod 252. Thus, the float 260 is generally donut shaped. In this embodiment, the float 260 comes in contact with the signal wire defined by the single rod probe 252. The single rod probe 252 returns a signal representing level of the float 260, rather than directly the level of the liquid. Particularly, the return signal provided by the float 260 is substantially stronger than a return signal provided by level of the material 24. Signal gain utilized in the guided wave radar transmitter 43 can be adjusted to effectively ignore return signal produced by the material and thus respond only to the substantially stronger return signal produced by the float 260. Moreover, the transmitter 43 can be configured to transmit an error signal if the float 260 fails. With failure, the float 260 will sink to the bottom of the chamber 26 and fall off the single rod probe 252. This would result in no return signal being received by the transmitter 43. The transmitter thus senses the absence of a return signal and indicates a failure condition.

In the above described embodiments, the measurement transmitter 43 comprises a guided wave radar instrument. Alternatively, the measurement transmitter 43 could use other techniques such as, for example, capacitance. In use as a capacitance level measurement instrument, the measurement circuit 56 measures capacitance between the probe and the vessel or shield, or the like. As is known, the measured capacitance represents level. In such applications, the shield provides a physical shield from the float, rather than an electromagnetic shield as with a guided wave radar instrument.

As is apparent, the shape of the chamber 26 may be different from that shown. Likewise, the chamber 26 may be connected to the vessel 24 by only one pipe. The vessel 22 may be pressurized or nonpressurized. The present invention is not directed to any particular tank or vessel configuration or chamber configuration.

Thus, in accordance with the invention, there is provided a redundant level measuring system comprising a probe-type measuring transmitter and a magnetic level indicator.

We claim:

1. A redundant level measuring system comprising:
    a chamber for fluidic coupling to a process vessel whereby material level in the vessel equalizes with material level in the chamber;
    a float including a magnet in the chamber for rising and falling with material level in the chamber;
    a magnet actuated visual indicator mounted to the chamber for indicating level of the magnet in the chamber;
    a measurement instrument including a probe and a measurement circuit, the instrument being mounted atop the chamber with the probe extending downwardly into the chamber, and the measurement circuit measuring a characteristic of the probe representing level of the material in the chamber; and
    shield means in the chamber for isolating the float from the probe.

2. The redundant level measuring system of claim 1 wherein the probe comprises a coaxial probe having a signal rod contained in an outer tube and wherein the outer tube defines the shield means.

3. The redundant level measuring system of claim 1 wherein the shield means physically isolates the probe from the float.

4. The redundant level measuring system of claim 1 wherein the shield means comprises an elongate screen extending longitudinally in the chamber providing an electromagnetic shield and the screen is disposed between the probe and the float.

5. The redundant level measuring system of claim 4 wherein the screen comprises a ferrous metal screen.

6. The redundant level measuring system of claim 4 wherein the probe comprises a twin rod probe.

7. The redundant level measuring system of claim 4 wherein the probe comprises a single rod transmission line and the chamber comprises a return for the transmission line.

8. The redundant level measuring system of claim 4 wherein the probe comprises a transmission line and the screen comprises a return for the transmission line.

9. The redundant level measuring system of claim 1 wherein the shield means comprises an electromagnetic shield cage housing the float in the chamber.

10. The redundant level measuring system of claim 1 wherein the probe comprises a capacitance probe.

11. A redundant level measuring system comprising:
    a chamber for fluidic coupling to a process vessel whereby material level in the vessel equalizes with material level in the chamber;
    a float including a magnet in the chamber for rising and falling with material level in the chamber;
    a magnet actuated visual indicator mounted to the chamber for indicating level of the magnet in the chamber;
    a guided wave radar measurement instrument including a probe defining a transmission line, the instrument being mounted atop the chamber with the probe extending downwardly into the chamber, and a measurement circuit connected to the probe for generating pulses on the transmission line and receiving reflected pulses returned on the transmission line, the reflected pulses representing level of the material in the chamber; and
    shield means in the chamber for electromagnetically isolating the float from the transmission line.

12. The redundant level measuring system of claim 11 wherein the probe comprises a coaxial probe having a signal rod contained in an outer tube and wherein the outer tube defines the shield means.

13. The redundant level measuring system of claim 11 wherein the shield means physically isolates the probe from the float.

14. The redundant level measuring system of claim 11 wherein the shield means comprises an elongate screen extending longitudinally in the chamber providing an electromagnetic shield and the screen is disposed between the probe and the float.

15. The redundant level measuring system of claim 14 wherein the screen comprises a ferrous metal screen.

16. The redundant level measuring system of claim 14 wherein the probe comprises a twin rod probe.

17. The redundant level measuring system of claim 14 wherein the probe comprises a single rod probe and the chamber comprises a return line for the transmission line.

18. The redundant level measuring system of claim 14 wherein the screen comprises a return for the transmission line.

19. The redundant level measuring system of claim 11 wherein the shield means comprises an electromagnetic shield cage housing the float in the chamber.

20. A redundant level measuring system comprising:
    a chamber for fluidic coupling to a process vessel whereby material level in the vessel equalizes with material level in the chamber;

a measurement instrument including a probe and a measurement circuit, the instrument being mounted atop the chamber with the probe extending downwardly into the chamber; and a float including a magnet in the chamber proximate the probe for rising and falling with material level in the chamber; and a magnet actuated visual indicator mounted to the chamber for indicating level of the magnet in the chamber, wherein the measurement circuit measures a characteristic of the probe representing level of the magnet in the chamber.

21. The redundant level measuring system of claim 20 wherein the probe comprises a single rod transmission line.

22. The redundant level measuring system of claim 20 wherein the float comprises a through opening receiving the probe.

* * * * *